Oct. 2, 1956  J. F. BOYLE  2,765,131
INFLATABLE ESCAPE CHUTE ASSEMBLY
Filed May 4, 1954  2 Sheets-Sheet 1

INVENTOR.
JAMES F. BOYLE
BY
Willard D. Eakin
ATTORNEY

Oct. 2, 1956  J. F. BOYLE  2,765,131
INFLATABLE ESCAPE CHUTE ASSEMBLY
Filed May 4, 1954  2 Sheets-Sheet 2

*INVENTOR.*
JAMES F. BOYLE
BY *Willard D. Eakin*
ATTORNEY

United States Patent Office 2,765,131
Patented Oct. 2, 1956

2,765,131

INFLATABLE ESCAPE CHUTE ASSEMBLY

James F. Boyle, Brielle, N. J., assignor, by mesne assignments, to The Garrett Corporation, Los Angeles, Calif., a corporation of California Application May 4, 1954, Serial No. 427,617

9 Claims. (Cl. 244—137)

This invention relates primarily to an inflatable escape chute for facilitating the safe escape of persons or removal of cargo from an aircraft making a forced landing where no rigid stair, ramp or gangplank is available, the exit from the aircraft in such cases usually being high above the ground. It is also susceptible of being used in other situations calling for an emergency escape chute.

A simple fabric sheet heretofore has been proposed as an escape slide but it requires that sufficient personnel first get safely to the ground by other means, as by sliding down a rope, to hold the lower end of the fabric so that it will be sufficiently taut and at a suitable angle to serve satisfactorily as a slide.

This may call for more able bodied men than are available for the job, or more than should be diverted from other duties.

Also the simple fabric sheet fails to inspire such confidence as to overcome the reluctance of some passengers to consign themselves to it, and hesitation on the part of such excessive individual may result in excessive delay of the evacuation of the last person or persons.

Such unfortunate delay may result also from the fact that it takes some time for each person to pick himself up and get out of the way at the bottom of the fabric sheet.

Such delays can be very bad in the case of an aircraft carrying a large number of persons.

My chief objects are to provide a chute adapted to be compactly stowed and carried in the aircraft and to obviate the disadvantages above referred to.

A further object is to provide an inflatable chute with means for distending its stiffening elements in spite of extremely low temperatures such as prevail in the far north or at high altitudes and preclude the use of carbon dioxide as the distending medium.

Of the accompanying drawings.

Referring first to Figs. 1 to 4, 10 is the body of an airplane, or other aircraft, having a floor 11, a door-opening 12 and vertical hand bars 13, 13.

Figure 2:
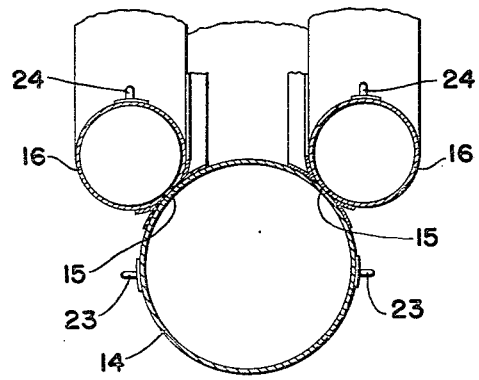
Fig. 2 is a section of the same on line 2—2 of Fig. 1.
Figure 1:
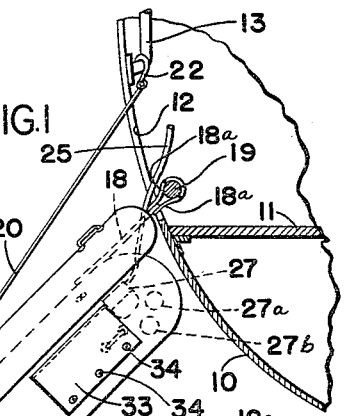
Fig. 1 is an elevation of a chute embodying my invention in its preferred form and in operative relation to the aircraft, parts of the latter being shown in section.
Figure 3:
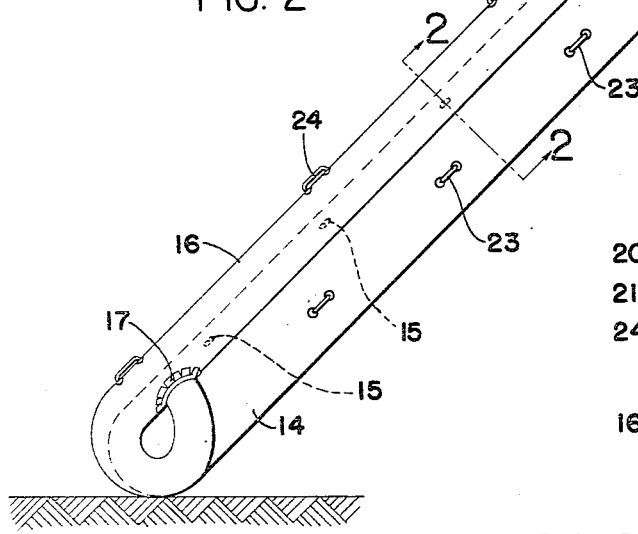
Fig. 3 is a plan view of the chute in operative condition.
Figure 3:
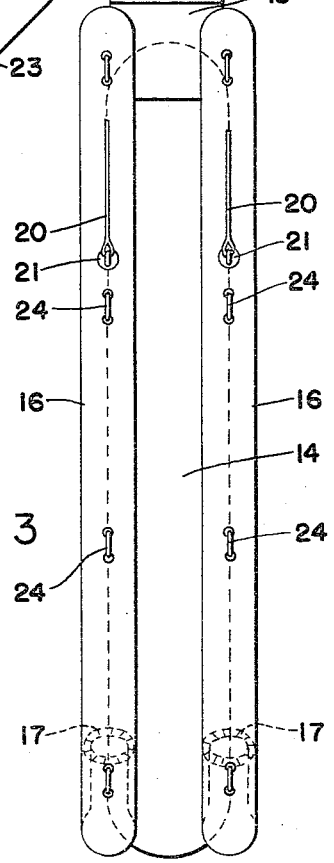

The chute comprises a large, middle, closed-end, flexible, inflatable fabric tube 14 and, longitudinally seamed to it and in communication with its interior through holes 15, 15, Figs. 1 and 2, a pair of cross-sectionally smaller, stiffening, slideway-defining side tubes 16, 16. Each of the three tubes, when strongly distended by internal fluid, is a fluid-trussed beam having high resistance to bending strains.. The upper ends of the tubes 16, like that of the larger middle or chute-floor tube, are closed by integral dome-shaped end walls, whereas the lower end portion of each side tube 16 is of diminishing cross-section and is curved back under itself and has its end closed by being seamed to the main part of the tube at 17, as shown clearly in Fig. 1.

The lowest parts of the curved lower end portions of the side tubes are at least as low as the lowest part of the curved end wall of the middle tube, these curvatures providing for stability of ground contact in spite of variation of the incline of the chute as determined by the height of the aircraft door from the ground.

At its upper end the chute is provided with a mounting sheet of fabric 18 which is secured in tangent relation to the upper face of the middle tube and at right-angles to the closest-together parts of the side tubes. The upper margin of the fabric sheet 18 is provided with a pair of lacing flaps 18$^a$, 18$^a$, by which it is laced to a supporting bar 19.

A pair of adjusting or brace lines such as the line 20, Fig. 1, are secured at their lower ends to the respective side tubes as at 21 and at their upper ends are provided with respective hooks such as the hook 22 for engaging the respective doorway bar 13, for manipulation of the chute and for supplementing the stiffness of the tubes in the part where the chute's load is initially applied.

Preferably in the region of the aspirator-inflator 27 the inflatable structure is provided with an adjustable escape valve 27$^a$ for preventing bursting of the structure in case of the air within it being expanded by the heat of a fire, and with a large capacity emptying valve 27$b$ for deflation of the structure to permit it to be rolled up for stowage.

The middle tube 14 is provided with fabric or other hand loops 23, 23, and the side tubes with similar loops or handles 24, 24, for manipulation of the chute and also to provide something for survivors to hold onto in case the aircraft lands upon water, the chute then serving as a float.

In case the aircraft is in danger of sinking, the buoyant chute can be cast adrift from it by simply cutting or breaking the lacing of its flaps 18$^a$, unhooking the hooks 22, and disconnecting or severing an inflating hose 25 hereinafter described.

The said hose, 25, leads from a compressed-air cylinder 26, Figs. 4 to 7, to an aspirator-type inflator 27 which is mounted upon the wall of the large, chute-floor tube 14 near the upper end of the latter and is adapted to inject a jet of air from the cylinder 26, and atmospheric air entrained by the jet, into the tube 14 to inflate it. Air passes from it, through the holes 15, 15, into the side-rail tubes 16, 16, to inflate them also.

The construction and operation of aspirator-type inflators suitable for this use are known in the art, an example being shown and described in Freygang U. S. Patent No. 2,399,670.

The air cylinder 26 is secured against the wall 10 of the aircraft, at one side of the door opening 12, by bracket members 28, 29 and with the bracket 29 is associated a valve having a turning handle 30 for controlling flow of compressed air from the cylinder into the hose.

Figures 4, 5:
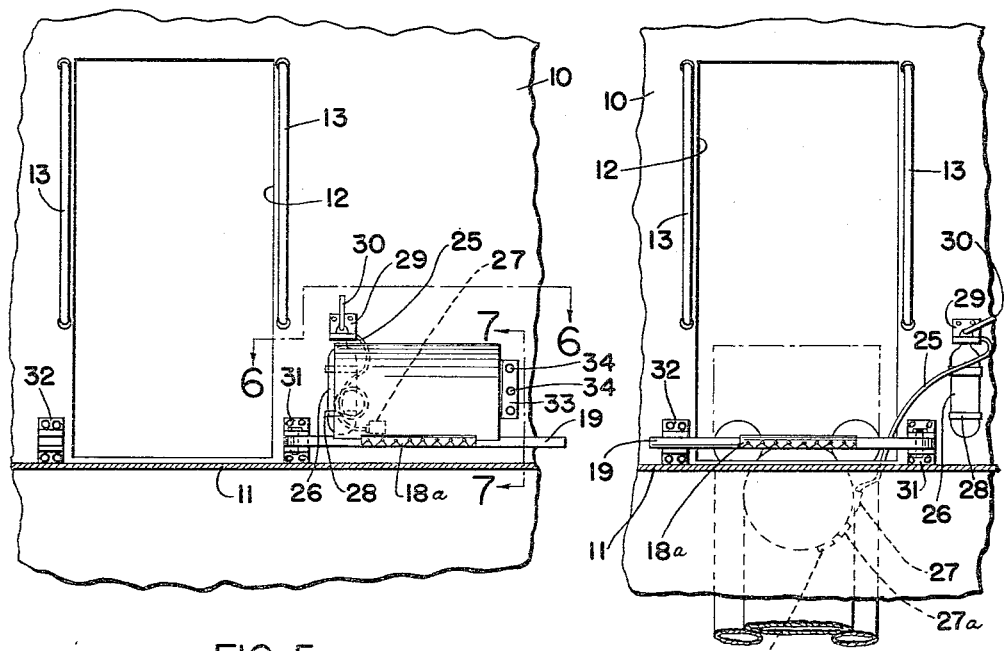
Fig. 4 is a fragmentary elevation of the chute, in operative condition, from the interior of the aircraft.
Fig. 5 is an elevation of the chute in deflated and stowed condition, inside of the aircraft, and of adjacent parts of the latter.
Figure 6:
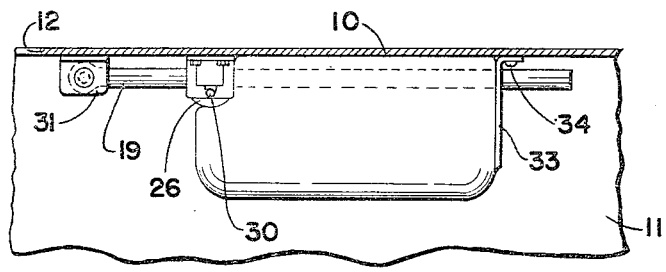
Fig. 6 is a section taken on the line 6—6 of Figure 5.
Figure 7:
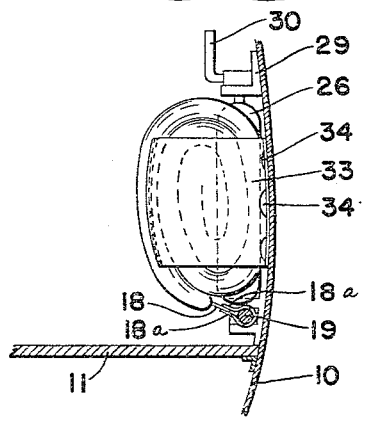
Fig. 7 is a section on line 7—7 of Fig. 5.

The bar 19 to which the upper end of the chute is attached is hinged at one end, on a vertical axis, to a wall bracket 31, at one side of the door opening, and is adapted to be turned, with the collapsed and rolled chute, from its stowage position of Figs. 5 to 7 to its service position of Figs. 1 to 4. In the latter position the swinging end of the bar, projecting beyond the chute, is engaged in a spring clip 32 secured to the aircraft wall 10 at the other side of the door opening. The door itself, being outwardly opening, is not shown.

For holding the chute in rolled and stowed condition against the wall 10, a fabric flap 33 is seamed to a side of the chute-floor tube 14 near the upper end of the latter, in position for snap-fastener elements 34, 34 on its outer margin to be detachably engaged with mating elements on the wall 10 when the deflated chute is rolled up from its lower end and swung, with the bar, 19, to the stowage position of Figs. 5 to 7.

Figure 8:
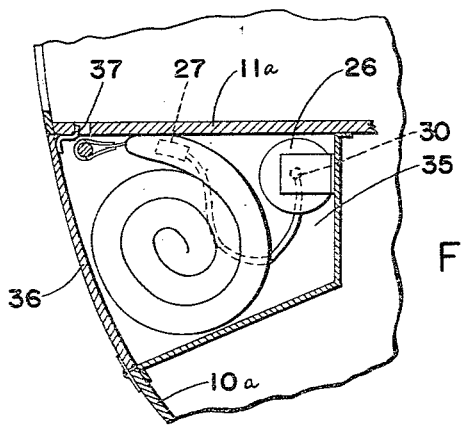
Fig. 8 is a fragmentary vertical section of parts of an aircraft defining a storage chamber, the chute and its inflating means, mounted and stowed therein, being shown in elevation, this being a modification of the arrangement illustrated in Figs. 1 to 7.

In the modification shown in Fig. 8 the stowage compartment is defined by the aircraft floor 11ª, a slant-floored box member 35 secured to the floor 11ª and to the wall 10ª of the aircraft, and a quick release drop door 36 hinged at its lower margin to the wall 10ª and provided at its upper margin with a spring latch 37 disengageable from above the floor 11ª. Upon the dropping of the door 36 access to the compartment is provided for assuring the rolling out of the chute and opening of the valve of the air cylinder 26, the latter being mounted upon a wall of the box member 35 and provided with any suitable means, not shown, for automatically opening its valve upon the dropping of the door 36.

The escape chute as described provides a trough-like channel with its floor terminating at its lower end a substantial distance above the ground, and this, as well as the cross-sectional shape of the channel, causes the user of the chute to come to the ground in such a way that his momentum carries his body forward so as to bring him to a standing and running position. This helps to keep the lower end of the chute cleared at all times and avoids injuries.

Also, it is possible to walk up the chute, as for re-entering the aircraft for rescue or other purposes.

The use of the aspirator-type inflator permits the use of a relatively small and light cylinder 26 and provides for very rapid distension of the chute.

Other modifications are possible without departure from the scope of the invention as defined in the appended claims.

I claim:

1. An escape-chute assembly comprising an elongated, flexible-walled, fluid-distensible slide-way structure having separable wall elements defining a fluid retaining chamber between them and externally presenting a slide-way surface for supporting contact with an escaping person sliding by gravity thereon, means for holding one end of the same at a position in the air that is at a substantial distance above the earth's surface, and means for effecting fluid-distension of said structure, the walls of the said chamber and the fluid therein constituting a fluid-trussed beam of sufficient strength against bending to support against gravity the weight of an escaping person sliding upon it while the lower end of the chute is supported at such height in relation to the holding of its upper end that the chute has a safely moderate slope for escape of the person by free gravity sliding of the escaping person upon it.

2. An assembly as defined in claim 1 in which the defined structure comprises a plurality of parallel flexible tubes extending lengthwise of the chute and surface bonded to one another for augmenting the resistance of the structure to bending strain when it is inflated.

3. An assembly as defined in claim 2 in which a plurality of the tubes extend lengthwise of the chute and define, when inflated, a trough-shaped slide-way.

4. An assembly as defined in claim 1 in which the lower end of a fluid-retaining flexible wall of the defined structure is curved about a horizontal transverse axis and thus has a rocker-shaped, downwardly-facing, supporting surface, for like supporting contact of the curved part of the said wall with the earth's surface when the slide-way structure is at different inclinations in relation to earth's surface.

5. An assembly as defined in claim 4 in which the defined structure comprises a chute-floor tube and a pair of side-rail tubes curved backwardly under themselves at their lower ends.

6. An assembly as defined in claim 1 and including angle-brace means connected at one of its ends to the defined structure at a position intermediate said structure ends, and hook-on means on the other end of said brace means, for quick anchorage of the brace means to a support.

7. An assembly as defined in claim 1 in which the defined means for holding an end of the fluid-distensible structure at a high position is quick-release means for so holding it while it is in fluid-distended condition, to permit the structure to be cast adrift as a flotation device.

8. An assembly as defined in claim 1 in which the defined means for holding an end of the defined structure is an aircraft body having a doorway and a bar, having the said structure attached thereto, and hinged on said body for hinging movement of the bar to and from an operating position across the lower part of said doorway and a stowage position away from said doorway.

9. An assembly as defined in claim 1 in which the defined means for holding an end of the defined structure is an aircraft body having a floor and a sidewall doorway above said floor, means under said floor and near said doorway for holding an end of said structure and for supporting said structure in rolled condition from below, and quick-release closure means constituting a part of the wall of the aircraft for retaining the rolled structure in stowed position and releasing it upon being opened.

References Cited in the file of this patent

UNITED STATES PATENTS

| | | |
|---|---|---|
| 511,472 | Sumovski | Dec. 26, 1893 |
| 837,602 | Benenato | Dec. 4, 1906 |
| 1,205,033 | Seely | Nov. 14, 1916 |
| 2,363,249 | Hutchinson | Nov. 21, 1944 |
| 2,389,160 | Manson | Nov. 20, 1945 |
| 2,421,679 | Bingham | June 3, 1947 |

FOREIGN PATENTS

| | | |
|---|---|---|
| 433,093 | France | Oct. 19, 1911 |
| 608,672 | Great Britain | Sept. 20, 1948 |
| 646,498 | Great Britain | Nov. 22, 1950 |